United States Patent [19]

Stevenson et al.

[11] 4,417,469
[45] Nov. 29, 1983

[54] SPEED AND TIMING ANGLE MEASUREMENT

[75] Inventors: Thomas T. Stevenson; Marios C. Zenios, both of Peoria, Ill.

[73] Assignee: Caterpillar Tractor Co., Peoria, Ill.

[21] Appl. No.: 277,744

[22] PCT Filed: Mar. 3, 1981

[86] PCT No.: PCT/US81/00268
§ 371 Date: Mar. 3, 1981
§ 102(e) Date: Mar. 3, 1981

[87] PCT Pub. No.: WO82/03125
PCT Pub. Date: Sep. 16, 1982

[51] Int. Cl.³ .......................................... G01M 15/00
[52] U.S. Cl. ................................. 73/119 A; 73/117.3
[58] Field of Search ................. 73/116, 117.3, 119 A; 123/414; 324/160, 173, 174, 179, 392, 178, 180

[56] References Cited

U.S. PATENT DOCUMENTS

| | | | |
|---|---|---|---|
| 2,145,347 | 1/1939 | Everitt | 235/61 E X |
| 3,964,443 | 6/1976 | Hartford | 123/32 |
| 4,205,377 | 5/1980 | Oyama et al. | 364/431 |
| 4,323,976 | 4/1982 | Radaelli et al. | 324/160 X |

Primary Examiner—Jerry W. Myracle
Attorney, Agent, or Firm—Stephen L. Noe

[57] ABSTRACT

Apparatus for determining the speed of an engine (10) and the phase shift between first and second shafts (16,19) rotatably driven by the engine (10). First and second fixed magnetic sensors (50,56) generate first and second signals (49,55) in response to movement of magnetically sensible members (47,53) through circular paths at speeds proportional to the speeds of the first and second shafts (16,19), respectively. Clock pulses from a fixed frequency clock (65) are counted to obtain a first count between successive first signals (49) and a second count between successive second and first signals (55,49). The first count is inverted to obtain information as to the instantaneous engine speed. The second count is divided by the first count to obtain information as to the instantaneous phase angle between the first and second shafts (16,19). Successive instantaneous information is averaged to cancel the effects of engine torsionals. The present invention is particularly useful in engine control systems requiring rapid updating of information as to the speed and timing advance angle of the engine.

31 Claims, 8 Drawing Figures

SPEED AND TIMING ANGLE MEASUREMENT

DESCRIPTION

Technical Field

This invention relates generally to internal combustion engines and more particularly, to apparatus for determining the actual speed and timing advance angle of such engines.

Background Art

Basic control of the operation of an internal combustion engine is accomplished by varying the amount of fuel delivered to the engine cylinders by the fuel pump and by controlling the time that the fuel in the cylinder ignites as the pistons approach top dead center on the compression stroke. In general, the amount of fuel delivered to the cylinders will control the speed of the engine while the timing of ignition will control the efficiency of fuel combustion.

In a typical four-stroke-cycle diesel engine a timing shaft is gear driven by the engine crank shaft at half engine speed, with the timing shaft being coupled to the fuel camshaft of a fuel pump by a timing mechanism so that the fuel pump will deliver fuel to half of the engine cylinders during one engine revolution and to the other half of the cylinders during the next revolution. A controllable fuel rack will vary the amount of fuel that the fuel pump delivers to the engine cylinders and the timing mechanism will vary the angular relation between the timing shaft and the fuel camshaft so that fuel is injected into the cylinders at the proper time in engine operation relative to the pistons reaching top dead center in their compression strokes.

In order to provide an electronic engine control system which will function to maintain engine performance at maximum efficiency under varying operating conditions, it is necessary to obtain precise information as to the actual engine speed and the magnitude of the timing advance angle.

Furthermore, for an engine control system to be effective, the system must have a rapid response time, with speed and timing advance angle information being updated many successive times during a single revolution of the engine.

There are a number of problems involved in providing suitable apparatus for obtaining the desired engine speed and timing advance information.

First, the apparatus should have a life which meets or exceeds engine overhaul time to prevent premature failure and loss of control. To meet this requirement, the components utilized for detection of speed and angular displacement of the fuel camshaft should be simple, rugged and non-contacting.

The presence of engine torsionals presents a significant problem in providing accurate information as to engine speed and timing advance angle. Briefly, internal combustion engines have inherent imbalances causing the instantaneous speed of the engine to vary sinusoidally during a sequential operation of the pistons, with the engine being accelerated during operation of one half of the pistons and decelerated during the successive operation of the other half of the pistons. If the engine is operating at a given average speed, and if the instantaneous engine speed is determined once for, and at the same time during, each full cycle of sinusoidal operation, each successive instantaneous speed determination will be the same as before. Likewise, if the average engine speed should vary, the instantaneous speed determination will vary directly therewith.

However, if a speed determination is made more frequently than once during a full cycle of sinusoidal operation, as is desired in the present invention, the successive instantaneous speed determinations will vary from one another even though the average engine speed remains the same. Thus, in order to obtain useful speed information many times successively during a full sinusoidal cycle of engine operation, the effect of the engine torsionals must be cancelled out so that each successive bit of information will have the same relationship to the average engine speed.

Measurements of the timing advance angle have been made by a first sensor operable to detect movement of a fixed point on the timing shaft therepast and a second sensor operable to detect movement of a fixed point on the fuel camshaft therepast, and by means to measure the time between operation of the two sensors. The time lapse is proportional to the phase angle between the shafts produced by the timing mechanism and can thus be used to provide information as to the magnitude of the timing advance angle. However, such systems as have been heretofore devised require careful initial mechanical adjustment of the sensor systems in order to provide accurate timing advance angle information. It is accordingly desirable to provide a similar sensor system for timing advance angle determination which does not require such initial adjustment.

Speed and timing advance angle determination systems which provide analog information are inherently inaccurate, since age and varying temperature conditions will often cause component values to change. It is accordingly desirable to provide a system wherein digital information is obtained.

The present invention is directed to overcoming one or more of the problems as set forth above.

Disclosure of the Invention

In one aspect of the invention, and in a system having first and second shafts and timing means for driving one shaft by the other at a desired and variable angular relationship between the shafts, a sensing system is provided having: first and second sensible members rotatable through circular paths at speeds proportional to the speeds of the first and second shafts, respectively; first and second signal generating means for generating first and second signals, respectively, in response to movement of the first and second sensible members past a predetermined point in each path thereof; a fixed frequency clock; means for obtaining a first count of the number of clock pulses occurring between consecutive first signals and a second count of the number of clock pulses occurring between consecutive first and second signals; and, means for generating an angle-indicating signal proportional to the ratio of the first and second counts and/or for generating a speed-indicating signal inversely proportional to the first count.

A further aspect of the invention is that sinusoidal torsional effects are averaged out by obtaining many successive angle-indicating and/or speed-indicating signals during a full revolution of the shafts, and each time new signals are obtained, a predetermined number of successive signals are added together and divided by the predetermined number.

Another aspect of the invention is that the first count is obtained by counting the number of clock pulses occurring between the signal from one of the first and second signal generators and the next signal from the other of the signal generators, by counting the number of clock pulses occurring between said next signal from said other of the signal generators and the next signal from one of the signal generators, and by adding these two numbers of clock pulses together.

A still further aspect of the invention is that an initial angle-indicating signal is obtained corresponding to a minimum advance angle and is compared to subsequently obtained angle-indicating signals to derive a signal corresponding to the actual angle advance from minimum advance.

The foregoing and other aspects will become apparent from the following detailed description of the invention when considered in conjunction with the accompanying drawings.

BRIEF DESCRIPTION OF THE DRAWINGS

In the drawings, forming a part of this application and in which like parts are designated by like reference numerals throughout the same.

BEST MODE FOR CARRYING OUT THE INVENTION

Figure 1:
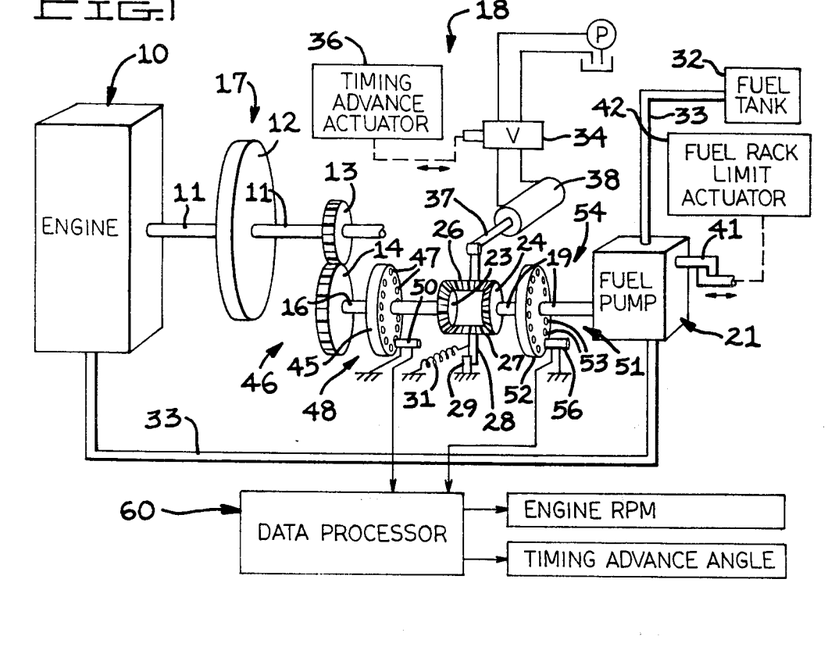
FIG. 1 is a generally schematic illustration of an engine and fuel pump system utilizing the present invention.

Referring now to the drawings wherein preferred embodiments of the invention are shown, FIG. 1 illustrates schematically an internal combustion engine 10, such as a four-stroke-cycle diesel engine, the engine having a crank shaft 11 to which circular flywheel member 12 is fixed for rotation at a speed equal to the engine speed. Meshed gears 13 and 14, on crank shaft 11 and timing shaft 16 respectively, are provided to transmit engine rotation to the timing shaft 16. As is seen, engine 10, crank shaft 11 and gears 13 and 14 constitute a drive means 17 for driving a timing shaft 16 at a rotational speed directly proportional to the engine speed, the constant of proportionality being dependent on the gear ratio of gears 13 and 14. For a four-stroke-cycle diesel engine the gear ratio is such that the timing shaft 16 is driven at half the speed of the engine.

A timing means 18 is provided to rotatively drive fuel camshaft 19 of fuel pump 21 by timing shaft 16 and to vary, within a predetermined range, the angular relationship between the timing shaft 16 and fuel camshaft 19. As illustrated in FIG. 1, timing means 18 may comprise gears 23 and 24 fixed to timing shaft 16 and fuel camshaft 19, respectively, with the drive of gear 23 being transmitted to gear 24 by gears 26 and 27 which are each meshed with both gears 23 and 24 and are rotatable on spindle 28. Spindle 28 is biased towards a zero reference fixed stop 29 by spring 31. The system is initially bench set so that when the spindle 28 is against the stop 29, the fuel camshaft 19 will cause the fuel pump 21 to deliver fuel from fuel tank 32 and fuel line 33 to the engine 10 at a minimum advance (typically 14°) before top dead center of the engine pistons. Of course, other types of differentials could also be employed to control this angular relationship.

The timing means 18 will cause the timing advance angle of fuel delivery to be set at a desired value greater than minimum during operation of the engine 10 as by actuation of valve 34 in response to timing advance actuator 36, so that piston 37 of hydraulic cylinder 38 will extend or retract and cause gear spindle 28 to move to a desired position away from stop 29. At such desired position, gears 26 and 27 will cause fuel camshaft 19 to be driven at the same speed as that of timing shaft 16, but the angular relationship of the two shafts will have been increased from the minimum advance relationship.

Fuel pump 21 has a movable fuel rack 41, controlled by fuel rack actuator 42, to control the amount of fuel flow through the fuel pump.

A first rotation responsive means 46 is provided for generating a signal each successive time that engine 10 rotates through 360/N degrees, N being an integer. As illustrated here, the rotation responsive means 46 includes a plurality of holes 47 in a disc 45, equi-angularly spaced relative to, and equi-distally spaced from the axis of the flywheel. This disc 45 is axled on the timing shaft 16 at a position between gear 14 and gear 23. Holes 47 in disc 45 thus provide irregularities on the ferromagnetic disc which constitute magnetically-sensible members which rotate in a circular path around timing shaft 16. Similarly, disc 45 could be a gear, the teeth of which serve as magnetically-sensible members.

Rotation responsive means 46 also includes a first signal generating means 48 for generating a first signal 49 (FIG. 5) in response to each movement of a hole 47 past a predetermined point in the circular path of movement of holes 47. In particular the signal generating means 48 includes a fixed magnetic sensor 50 located adjacent the circular path of movement, the location of the sensor 50 thus determining the predetermined point in the path of movement of holes 47.

As illustrated, disc 45 has 24 holes 47, thus a first signal 49 will be generated each time the timing shaft 16 rotates through 360/24, or 15 degrees. Since timing shaft 16 is driven at half engine speed, a first signal will be generated each time the engine rotates through 30 degrees.

A second rotation responsive means 51 is provided for generating a second signal each successive time that the engine has rotated through 360/N degrees. As illustrated here, the rotation responsive means 51 includes a circular, ferromagnetic disk member 52 fixed to fuel camshaft 19 for rotation therewith, circular member 52 having a plurality of holes 53 equiangularly spaced around member 23 and equidistant from the axis of camshaft 19. As before, holes 53 provide magnetically-sensible, surface irregularity members which move in a circular path around camshaft 19.

Rotation responsive means 51 also includes a second signal generating means 54 for generating a second signal 55 (FIG. 5) in response to each movement of a hole 53 past a predetermined point in the circular path of movement of holes 53. As illustrated, the signal generating means 54 includes a fixed magnetic sensor 56 located adjacent the circular path of movement of holes 53. Again, the fixed location of the sensor 56 determines the predetermined point in the path of movement of holes 53.

As illustrated, the circular member 52 has twenty-four holes 53, and thus a second signal 55 will be generated for each 15 degrees of rotation of camshaft 19. Or, since fuel camshaft 19 is driven at half engine speed, a second signal will be generated for each 30 degrees of rotation of engine 10.

With the illustrated system, the number of first signals 49 from the flywheel sensor 50 will be equal to the number of second signals 55 from the fuel camshaft sensor 56 during any given length of time, such as the time that it takes the engine crank shaft 11, or the time that it takes either of the timing or fuel camshaft 16 or 19 to rotate through a full revolution, and the time interval between consecutive first signals will be equal to the time interval between consecutive second signals. The phase relationship of the first and second signals 49 and 55 will vary in accordance with the timing advance angle set by the timing means 18.

The first and second signals from the sensor 50 and fuel camshaft sensor 56 are then sent to the data processor 60 wherein the signals are used to generate digital signals proportional to the engine speed and the timing advance angle of the fuel pump 21.

In accordance with the present invention, the engine speed and timing advance angle signals are also generated in a manner so as to cancel out the effect of engine torsionals. As previously mentioned, piston-operated internal combustion engine have inherent imbalances which cause regularly occurring disturbances in the operation of the engine. Since one-half of the pistons drive the crank shaft during one complete engine revolution and the other, alternate one-half of the pistons drive the crank shaft during the subsequent revolution, and since these two sequences each have a discrete set of disturbances associated with them, the two revolutions will never have precisely the same characteristics. The crank shaft will always have a somewhat different amount of power transmitted to it during one full revolution than the one immediately preceding or following.

Figure 2:
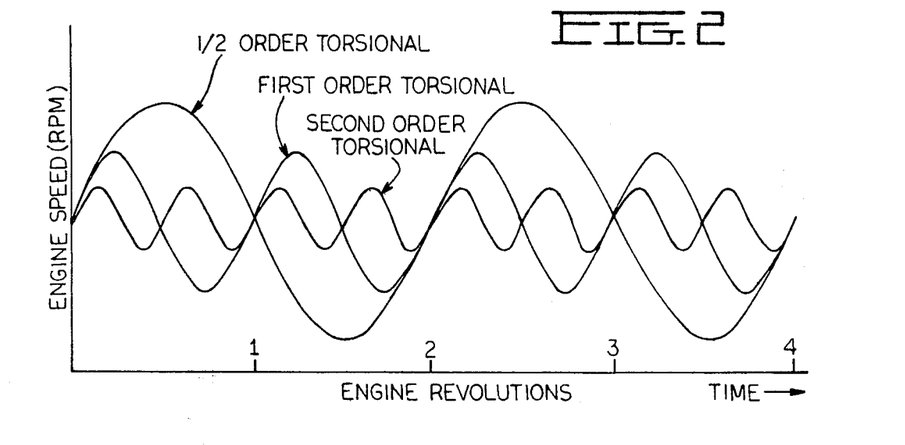
FIG. 2 is a graph illustrating the effect of engine torsionals.

As is seen in FIG. 2, the inherent engine imbalances will produce a half order torsional having a full cycle during two full engine revolutions, a first order torsional occurring in one full engine revolution, a second order torsional occurring in one-half an engine revolution, and so on with higher order torsionals of decreasing magnitude. The result of the torsionals is that the instantaneous engine speed will vary as the engine rotates. The mass of the drive system and flywheel will damp the effect of the imbalances but the actual speed will still vary sinusoidally through two engine revolutions, with the engine alternately accelerating and decelerating.

In the present invention, it is desired to obtain rapidly recurring signals, for example at 6 or 12 times each engine revolution, each signal being indicative of the average speed of the engine (so that the average speed can be quickly tracked during engine operation), in spite of the fact that the instantaneous engine speed will only be the same as the average speed once each full engine revolution, and will vary from the average speed during the rest of the engine revolution.

Figure 3:
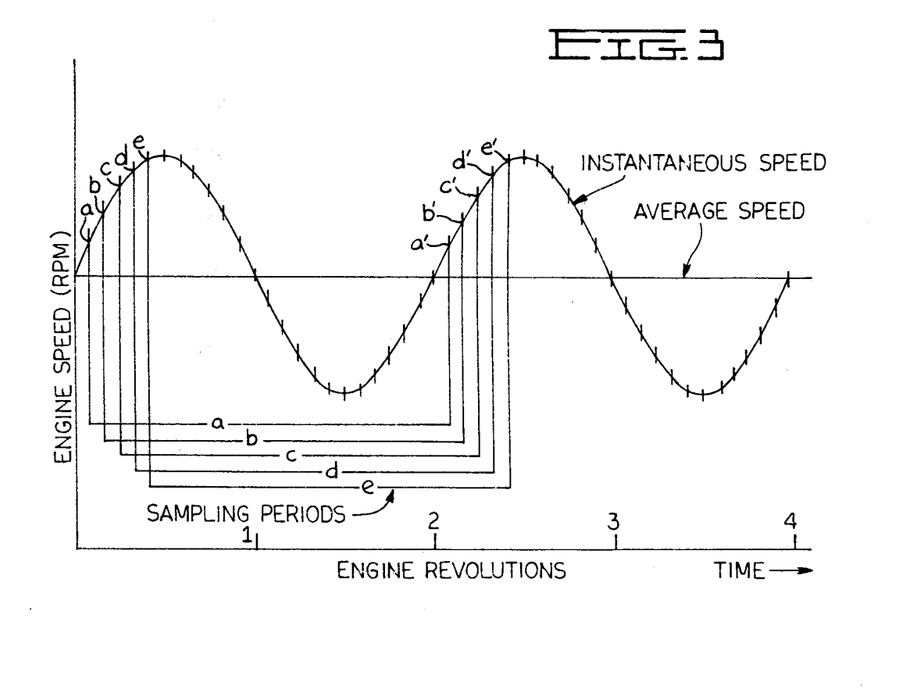
FIG. 3 is a graph illustrating the torsional cancellation technique of the present invention.

The technique used in the present invention to cancel out the effect of engine torsionals is illustrated in FIG. 3.

The instantaneous speed of the engine is determined N/M times for each full revolution of the engine, N being an integer representing the number of times that a signal from the sensor 50 is generated during a full engine revolution, and M being either 1 or 2, depending upon whether a new, updated speed determination is made each time a sensor 50 signal is generated or whether a new, updated speed determination is made for every other sensor 50 signal. (N/M)P consecutive instantaneous speed determination are then added and divided by (N/M)P, P being an integer representing a number of full engine revolutions, to obtain an average engine speed during the P number of engine revolutions.

For example, if the speed determinations are to be averaged over two full engine revolutions (P=2) and a rotation responsive means 46 is used with 24 holes 47 in the disc 45 (N=12, since disc 45 turns at half engine speed), and a speed determination is made for each time (M=1) the sensor 50 senses the movement of a hole 47 therepast (as in FIGS. 7 and 8), then 24 successive speed determinations will be averaged. As seen in FIG. 3, if the instantaneous speed determinations at the 24 sampling points in the sampling period beginning with "a" and ending with "a'" are taken, half of the instantaneous speed determination will be greater and half will be less than the average engine speed, so that when averaged, the 24 speed determinations will equal the average speed of the engine for the sampling period. The same will be true for any of the other sampling periods b-b', c-c', and so forth.

As is also apparent, if the speed averaging is done at each point a',b',c' and so on, then the average engine speed will be updated each time the engine has rotated through 360/N times 2, or 30 degrees.

If an instantaneous speed determination is made for every other hole 47 (M=2), as in FIGS. 4 and 5, then twelve speed determinations will be made and averaged, e.g. at a,c,e and so on, for two full engine revolutions. The successive averagings will again each be equal to the actual average engine speed, but the average engine speed information will only be available for every 60 degrees of engine rotation.

Figure 4:
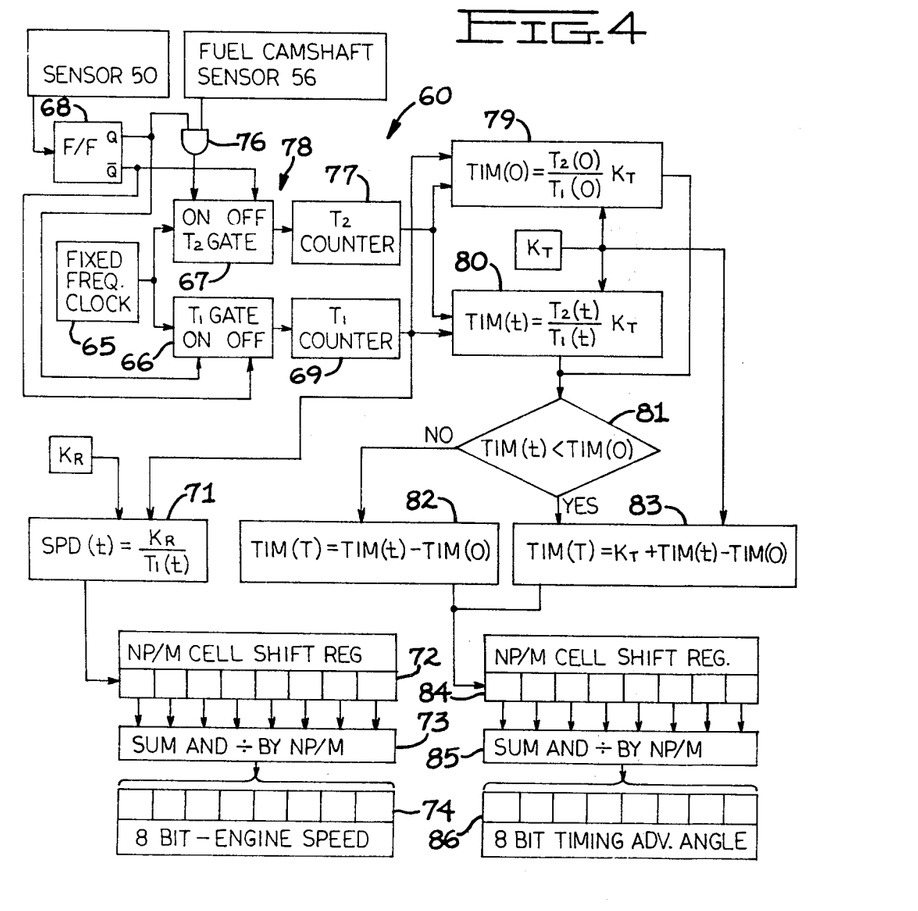
FIG. 4 is a block diagram of one form of the data processor of FIG. 1.
Figure 5:
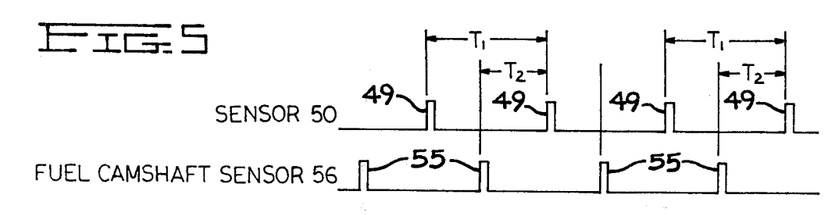
FIG. 5 is a timing chart of the signals produced by the sensor and fuel camshaft sensor and used in the data processor of FIG. 4.

FIG. 4 illustrates one embodiment of data processor 60 which can be used to generate average speed and average timing advance angle signals in response to generation of signals by the sensors 50 and 56. As is seen in FIG. 5, sensor 50 will generate a series of first signals 49 in response to each passage of a disc hole 47 therepast, with a time lapse of $T_1$ between consecutive leading edges of the signals. The fuel camshaft sensor 56 will likewise generate a series of second signals 55, each also having a time lapse of $T_1$, between consecutive signals. The first and second signals 49 and 55 will be out of phase with each other in an amount dependent upon the position of the timing means 18, and there will be a time lapse of $T_2$ between the leading edge of a second signal 55 and the leading edge of the next successive first signal 49. The time lapse $T_1$ is inversely proportional to engine speed—the faster the speed of engine rotation, the shorter the time of $T_1$ and vice versa. The time lapse $T_2$, for any given phase relation between the timing and fuel camshaft 16 and 19 is also inversely proportional to engine speed. The ratio of $T_2/T_1$ is proportional to the degree of phase relation between the timing and fuel camshafts 16 and 19, and will remain constant for any given degree of phase relation regardless of engine speed.

In the data processor 60 of FIG. 4, a fixed frequency clock 65 generates a continuous series of high frequency clock pulses which are applied to the inputs of the $T_1$ gate 66 and the $T_2$ gate 67. The first signals 49 from the disc sensor 50 are applied to flip-flop 68 so that a high Q flip-flop output from alternate first signals 49 will cause the $T_1$ gate 66 to close and a high Q flip-flop output from the next successive first signals 49 will cause the $T_1$ gate 66 to open.

During the time the $T_1$ gate 66 is closed, clock pulses from clock 65 will pass through the gate to the $T_1$ pulse counter 69 and be counted. When the $T_1$ gate is then opened, the $T_1$ pulse counter 69 will have a count of the number of clock pulses occurring during the time interval beginning and ending with successive first signals 49. Since clock 65 has a fixed frequency, the count of the $T_1$ pulse counter 69 will be inversely proportional to the speed of the engine.

After the $T_1$ gate has opened, the count $T_1(t)$ i.e. the instantaneous count for 30° of engine revolution, in the $T_1$ counter is applied to divider 71, along with a constant $K_R$, the divider 71 functioning to divide the constant $K_R$ by the count $T_1(t)$ and serving as a speed-indicating means for generating an instantaneous speed-indicating signal, SPD(t), which is inversely proportional to the count $T_1(t)$ of the counter 66 and is thus directly proportional to the instantaneous engine speed measured during the time the $T_1$ gate 66 was closed. The constant $K_R$ is chosen to scale the $T_1(t)$ count so that a useful eight-bit binary coded SPD(t) signal is obtained. This is accomplished once the data is loaded into the register.

The SPD(t) signal is then applied to the input cell of shift register 72, the shift register having NP/M number of cells. In the embodiment presently described, shift register 72 would have 12 cells. As the engine continues to rotate, the successively generated speed-indicating signals SPD(t) will be applied to shift register 72 so that the shift register will have, at any time, the 12 most recent successive speed-indicating signals therein.

Each time a new SPD(t) signal has been entered into shift register 72, the signals in all of the shift register cells are applied to the speed averaging means 73, shown here as an adder-divider, which adds the NP/M number of speed-indicating signals and divides the sume by NP/M to generate an average speed signal. The adder-divider 73 outputs the average speed signal into the 8 bit latch 74 which stores such signal until the next average speed signal is generated. The latched signal may then be used in an engine control system as desired.

During the time that the $T_1$ gate 66 has been closed by the high Q output of flip-flop 68 in response to a first pulse 61, the Q output of flip-flop 68 is also applied to AND gate 76 to enable the next successive second signal 55 from the fuel camshaft sensor 56 to close the $T_2$ gate 67. The $T_2$ gate 67 will be opened in response to the same first pulse 61 which opens the $T_1$ gate 66.

During the time the $T_2$ gate is closed, the $T_2$ counter 77 will count clock pulses passing through gate 67 and will thus obtain a count of the number of clock pulses occurring in the time interval beginning with a second signal 55 and ending with the next successive first signal 49.

As may be seen, the gates 66 and 67 and pulse counters 69 and 77 constitute a counting means 78 for counting clock pulses occurring in the time interval $T_1$ beginning and ending with consecutive first signal 49 from the pulse generating means 48 and for counting clock pulses occurring in the time interval $T_2$ beginning with a second signal 55 from pulse generating means 51 and ending with the next successive first signal 49 from pulse generating means 48.

When the engine is first started, the timing means 18 will be at minimum advance, e.g. 14° BTDC, and there will be an initial angular phase relation between the timing and fuel camshafts 16 and 19 to cause fuel delivery to the engine with minimum advance. Likewise, there will be an initial phase relation between the first signals 49 from the disc sensor 50 and the second signals 55 from the fuel camshaft sensor 56, corresponding to minimum advance, with a second signal 56 preceding the next successive first signal 55 by a particular degree of rotation. It is an aspect of the present embodiment that the circular member 52 on the fuel camshaft 19 can be randomly fixed thereto, without regard to whether its holes 53 have any particular orientation with respect to the holes 47 of the disc 45. For example, in one engine, for a given timing advance angle, it might take 10° of engine rotation between a second signal 55 and the next successive first signal 49, whereas in another engine, and with the same timing advance, it might require 20° of engine rotation between a second signal 55 and the next successive first signal 49.

In any given system, however, with the disc 45 fixed to timing shaft 16 and the circular member 52 fixed to the fuel camshaft 19, and with the sensor members 50 and 56 fixed relative to the circular paths of the sensible holes 47 and 53, the angle through which the engine must turn, between a second signal 55 and the next succeeding first signal 49, will be the same for any given degree of timing advance angle.

At engine start up, the engine will initially operate at minimum advance angle. The counts of both counters 69 and 77 are both applied to divider 79, along with a constant $K_T$, the divider 79 functioning to generate an initial, or reference, timing advance angle signal TIM-$(o)=T_{2(o)}K_T/T_{1(o)}$, corresponding to minimum advance angle, e.g. 14° BTDC. Dividing one count by the other gives a signal which is proportional to the degree of engine rotation between a second signal 55 and the next succeeding first signal 49 relative to the degree of engine rotation between consecutive first signals 49. Such signal is thus independent of engine speed. The constant $K_T$ scales that divided count to provide a useful binary coded signal, with the constant $K_T$ also representing the angle that the engine turns between successive first signals. Thus, in the particular system shown, if $T_1 = T_2$, then the signal TIM would represent a timing advance of 30°.

The initial timing advance angle signal TIM(o) is then stored for use in the data processor 60 until the engine is shut down.

After the initial timing advance angle signal TIM(o) has been generated, the counts of counters 69 and 77 are applied to divider 80, which functions to generate an instantaneous timing advance signal $TIM(t) = T_{2(t)}K_T/T_{1(t)}$, each time following a new count by counters 69 and 77. In the embodiment of FIG. 4, 30° of engine rotation are required to develop the counts in counters 69 and 77 and a new timing advance signal TIM(t) will be generated in the next 30° of engine rotation. Accordingly, six new timing advance signals TIM(t) will be generated for each full engine revolution.

The initial and instantaneous timing advance signals TIM(o) and TIM(t) are applied to logic circuit 81. If the magnitude of the instantaneous timing advance signal TIM(t) is not less than the magnitude of the initial timing advance signal TIM(o), function block 82 will substract the initial timing advance signal TIM(o) from the instantaneous timing advance signal TIM(t) and generate a true timing advance signal TIM(t) which is proportional to the actual degree of timing advance produced by the timing means 18. If the instantaneous timing advance signal TIM(t) is less than the initial timing advance signal TIM(o), then function block 83 will add the angle $K_T$ to the instantaneous timing advance signal TIM(t) and then substract the initial timing advance signal TIM(o) therefrom to generate a positive true timing signal TIM(T) which is proportional to the actual angle of advance from minimum advance.

The successive true timing advance signals TIM(T) are entered into and advanced through the NP/M cell shift register 84. Each time a new TIM(T) signal is entered into shift register 84, the TIM(T) signals in the shift register cells are applied to adder-divider 85 which functions as an angle-averaging means for generating an average timing angle advance signal. Such signal is outputted into the 8-bit latch 86 which stores the signal until the next average timing advance angle signal is generated. The latched signal may be used in an engine control system as desired.

Figure 6:
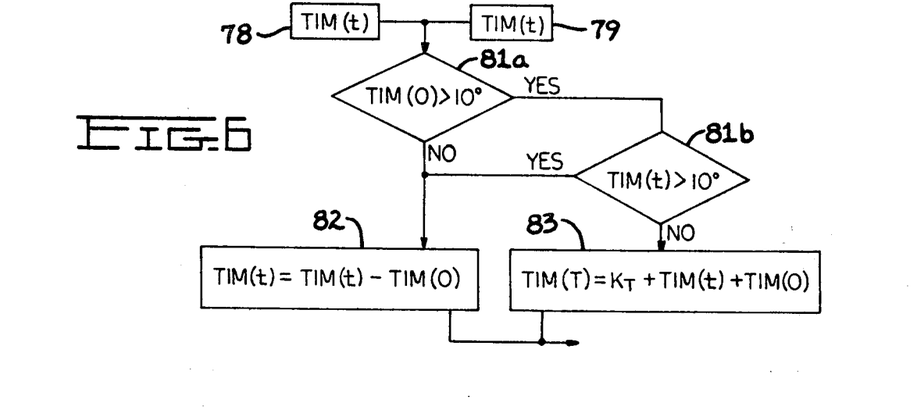
FIG. 6 is a modification of a portion of the data processor of FIG. 4.

FIG. 6 illustrates a modification of the system of FIG. 4, which may be used in an engine system wherein the timing advance means 18 is physically constrained so that a maximum timing advance of 20° from minimum advance is obtainable. In this case, the TIM(o) and TIM(t) timing advance angle signals are applied to the TIM(o)>10° and TIM(t)>10° logic circuits 81a and 81b and the function blocks 82 and 83 are actuated in accordance with the logic circuits to generate the desired true timing advance signals TIM(T).

As explained above, when the data processor 60 of FIG. 4 is used with the engine-fuel pump system of FIG. 1, the circular member 52 may be randomly fixed on the fuel camshaft 19, but the average speed and average timing advance signals will be updated only six times for each full engine revolution.

Figure 7:
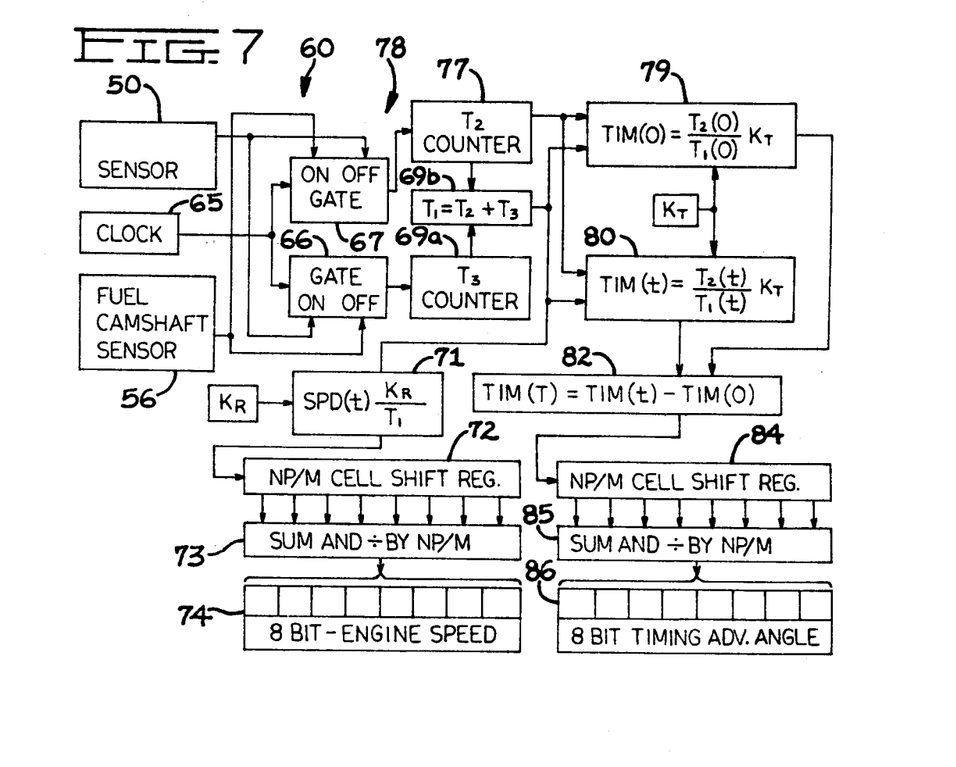
FIG. 7 is a block diagram of an alternate form of the data processor of FIG. 1.

The data processor 60a of FIG. 7, when used with the engine-fuel pump system of FIG. 1 enables the average speed and average timing advance signals to be updated twelve times for each full engine revolution (i.e. M=1), utilizing the same first and second rotation responsive means 46 and 51. In this embodiment, however, the circular member 52 must be more accurately located on the fuel camshaft 19 (or the fixed location of the fixed sensors 49 and/or 55 must be more accurately chosen) so that at minimum timing advance a particular second signal 55 is generated slightly before a particular first signal 49 and at maximum timing advance such second signal is generated before the same first signal 49 but after the preceding first signal 49. For example, if the maximum timing advance is 20° from minimum, then the circular member 52 should be oriented on the full camshaft 19 so that, at minimum timing advance angle, a second signal 55 will be generated somewhere between one and nine degrees in advance of a first signal 49.

The data processor 60a of FIG. 7 differs from that of FIG. 4 in that each second signal 55 from the fuel camshaft sensor 56 is used to close the $T_2$ gate 67, with the gate being opened by the next first signal 49 from the sensor 50. Thus, a new count by the $T_2$ counter 77 of the clock pulses from the fixed frequency clock 65 is obtained each time the engine rotates through 30°, or, twelve times during a full engine rotation.

The data processor 60a also differs in that gate 66 is closed by each first signal 49 from the sensor 50 and is opened by the next occurring second signal 55 from the fuel camshaft sensor 56. The clock pulses during this period are then counted by the $T_3$ counter 69a, with the count being proportional to the length of this time period.

Figure 8:
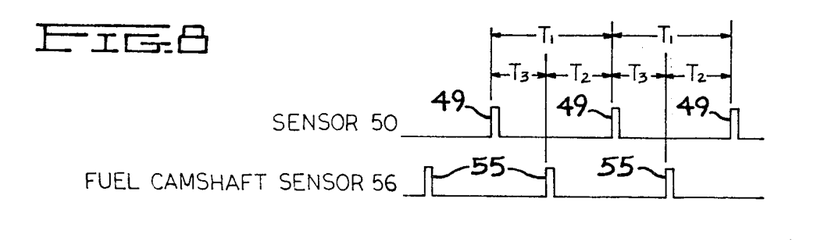
FIG. 8 is a timing chart of the signals produced by the sensor and fuel camshaft sensor and used in the data processor of FIG. 7.

After the $T_3$ count has been obtained and during the time that the $T_2$ counter 77 is counting clock pulses, the $T_3$ count is sent to adder 69b, enabling the $T_3$ counter 69a to be reset. After the $T_2$ count has been obtained by counter 77, it too is sent to adder 69b and a $T_1 = T_2 + T_3$ signal is generated during the time the next $T_3$ count is being obtained. As is seen in FIG. 8, regardless of the time relation of the sensor signals 49 and 55, the time periods $T_2 + T_3$ will always equal the time period $T_1$.

Thus, gates 66 and 67, pulse counters 69a and 77 and adder 69b constitute counting means 78 for counting clock pulses occurring in the time interval $T_1$ beginning and ending with consecutive first signals from the pulse generating means 48 and for counting clock pulses occurring in the time interval $T_2$ beginning with a second signal 55 from pulse generating means 51 and ending with the next successive first-signal 49 from pulse generating means 48.

The $T_1$ signal from adder 69b, generated for each 30° of engine revolution, is then sent to divider 71, and an average speed indicating signal is generated by the shift register 72 (having 24 cells) and adder-divider 73 as before. In this case, 24 instantaneous speed indicating signals will be averaged for two full engine revolutions and a new average speed indicating signal will be generated for each successive 30° of engine revolution.

The $T_1$ signal from adder 69b and $T_2$ signal from counter 77 will also be applied, as before, to dividers 79 and 80 wherein an initial timing advance signal TIM(o) and subsequent instantaneous timing advance signals TIM(t) are generated.

Since the circular member 52 on the fuel camshaft 19 is oriented so that the instantaneous timing advance signal TIM(t) is always greater in magnitude than the initial timing advance signal TIM(o), these signals are then sent directly to function block 82 wherein is generated the instantaneous true timing advance signal TIM(T)=TIM(t)−TIM(o). The TIM(T) signals are sent successively to 24-cell shift register 84 and the 24 signals occurring during two full revolutions of the engine are averaged by adder-divider 85 and latched into the 8-bit latch 86, once for each successive 30° of engine rotation.

Industrial Applicability

The present invention provides a system wherein digital information as to the true speed and timing advance angle of an internal combustion engine can be easily obtained, with the effects of engine torsionals cancelled out, and with such information being constantly updated many times during a single revolution of the engine.

Such system is particularly useful in electronic engine control systems wherein it is necessary to know the true engine speed and timing advance angle in order to regulate the fuel control to the engine for maximum efficiency of operation with minimum exhaust emissions.

What is claimed is:

1. In a system having first and second rotatable shafts (16, 19) timing means (18) for rotatably driving one (19) of said shafts (16,19) by the other (16) and for varying, within a predetermined range, the angular relationship between said shafts (16,19), and drive means (17) for driving the other (16) of said shafts (16,19) at a selectable speed of rotation, the improvement comprising:
- at least one first sensible member (47) rotatable at a speed constantly proportional to the speed of said first shaft (16) and movable through a first circular path;
- a first signal generating means (48) for generating a first signal (49) in response to movement of each first sensible member (47) past a predetermined point (50) in said first circular path;
- at least one second sensible member (53) rotatable at a speed constantly proportional to the speed of said second shaft (19) and movable through a second circular path;
- a second signal generating means (54) for generating a second signal (55) in response to movement of each second sensible member (53) past a predetermined point (56) in said second circular path;
- clock means (65) for generating a series of fixed frequency clock pulses;
- counting means (78) for:
  - (a) obtaining a first count of the number of clock pulses occurring in the time interval ($T_1$) beginning and ending with consecutive signals (49) from one (48) of said first and second signal generators (48,54); and
  - (b) obtaining a second count of the number of clock pulses occurring in the time interval ($T_2$) beginning with a signal (55) from one (54) of said first and second signal generators (48,54) and ending with a successive signal (49) from the other (48) of said first and second signal generators (48,54); and
- angle-indicating means (79-83) for generating an angle-indication signal proportional to the ratio of said first and second counts of said counting means (78).

2. A system as set forth in claim 1, including:
speed-indicating means (71) for generating a speed-indicating signal inversely proportional to said first count of said counting means (78).

3. A system as set forth in claim 1, wherein said first and second sensible members (47,53) are magnetically sensible, said first signal generating means (48) includes a first magnetic sensor (50) adjacent said predetermined point in said first circular path and said second signal generating means (54) includes a second magnetic sensor 956) adjacent said predetermined point in said second circular path.

4. A system according to claim 1, including first and second circular members (12,52) each rotatable about the respective centers thereof, said first circular member having an equiangularly spaced plurality of said first sensible members (47) and said second circular member having an equiangularly spaced plurality of said second sensible members (53).

5. A system according to claim 4, wherein the length of time between successive signals (49) of said first signal generating means (48) is equal to the length of time between successive signals (55) of said second signal generating means (54).

6. A system as set forth in claim 4, wherein said first and second sensible members (47,53) are magnetically sensible, said first signal generating means (48) includes a first magnetic sensor (50) adjacent said predetermined point in said first circular path and said second signal generating means (54) includes a second magnetic sensor (56) adjacent said predetermined point in said second circular path.

7. A system according to claim 4, including:
speed-indicating means (71) for generating a speed-indicating signal inversely proportional to said first count of said counting means (78).

8. A system according to claim 4, wherein the number of said first and second sensible members (47,53) is such that N number of each of said first and second signals (49,55) are generated by said first and second generator means (48,54) during one full revolution of one of said first and second shafts (16,19), N being an integer, wherein said counting means (78) has the further function of obtaining N/M number of successive first and second counts during said one full revolution, M being an integer, wherein said angle-indicating means (79-83) has the further function of generating N/M number of successive angle-indicating signals during said one full revolution, and including:
angle-averaging means (84,85) for generating an average-angle signal equal to the sum of NP/M number of successive of said angle-indicating signals divided by the number $NP/_M$, wherein P is an integer representing a predetermined number of successive of said full revolutions.

9. A system according to claim 8, wherein said counting means (78) obtains said first count by obtaining (69a) a third count of the number of clock pulses occurring in the time interval ($T_3$) between two successive time intervals ($T_2$) and said second count is obtained and by adding (69b) and third count to one of said second counts.

10. In a system according to claim 8, wherein said counting means (78) includes first and second pulse counters (69,77), a first gate (66) connected between said clock means (65) and said first pulse counter (69), and a second gate (67) connected between said clock means (65) and said second pulse counter (77), said first gate (66) being successively closed and opened in response to successive signals (49) from one (48) of said first and second signal generating means (48,59), said second gate (67) being closed in response to a signal (55) from the other (54) of said first and second signal generating means (48,54) and opened in response to a signal (49) from said one (48) of said first and second signal generating means (48,54).

11. In a system according to claim 8, wherein said counting means (78) includes first and second pulse counters (69a,77), a first gate (66) connected between said clock means (65) and said first pulse counter (69a), and a second gate (67) connected between said clock means (65) and said second pulse counter (77), said first gate (69a) being closed in response to a signal (55) from the other (54) of said first and second signal generating means (48,54), said second gate (77) being closed in response to a signal (55) from said other (54) of said first and second signal generating means (48,54) and opened in response to a signal (49) from said one (48) of said first and second signal generating means (48,54).

12. A system according to claim 8, including:

speed-indicating means (71) for generating N/M number of successive speed-indicating signals during said one full revolution, each speed indicating signal being inversely proportional to said first count of said counting means (78); and speed-averaging means (72,73) for generating an average-speed signal equal to the sum of NP/M number of successive of said speed-indicating signals divided by the number NP/M.

13. A system as set forth in claim 12, wherein said counting means (78) has the function of obtaining said first count by obtaining (69a) a third count of the number of clock pulses occurring in the time interval (T₃) between two successive time intervals (T₂) wherein said second count is obtained and by adding (69b) said third count to one of said second counts.

14. In a system according to claim 12, wherein said counting means (78) includes first and second pulse counters (69,77), a first gate (66) connected between said clock means (65) and said first pulse counter (69), and a second gate (67) connected between said clock means (65) and said second pulse counter (77), said first gate (66) being successively closed and opened in response to successive signals (49) from one (48) of said first and second signal generating means (48,54), said second gate (67) being closed in response to a signal (55) from the other (54) of said first and second signal generating means (48,54) and opened in response to a signal (49) from said one (48) of said first and second signal generating means (48,54).

15. In a system according to claim 12, wherein said counting means (78) includes first and second pulse counters (69a,77), a first gate (66) connected between said clock means (65) and said first pulse counter (69a), and a second gate (67) connected between said clock means (65) and said second pulse counter (77), said first gate (69a), being closed a signal (49) from one (48) of said first and second signal generating means (48,54) and opened a signal (55) from the other (54) of said first and second signal generating means (48,54), said second gate (77) being closed a signal (55) from said other (54) of said first and second signal generating means (48,54) and opened a signal (49) from said one (48) of said first and second signal generating means (48,54).

16. In a system according to claim 8 wherein $$TIM = (T_2/T_1)K_T$$

in which
TIM = said angle-indicating signal,
$T_1$ = said first count of said counting means
$T_2$ = said second count of said counting means
$K_T$ = a constant,
said angle-indicating means (79-83) having the further functions of:

(a) generating an initial reference angle-indicating signal TIM(o),
(b) generating a subsequent angle-indicating signal TIM(t),
(c) generating a corrected angle-indicating signal TIM(T), wherein $$TIM(T) = TIM(t) - TIM(o),$$

when TIM(t) ≧ TIM(o), and $$TIM(T) = TIM(t) + K_T - TIM(o),$$

when TIM(t) < TIM(o).

17. In a system according to claim 1, wherein said drive means (17) includes an engine (10), an engine-driven crank shaft (11), a first gear (14) fixed to said first shaft (16), a second gear (13) fixed to said crank shaft (11) and in mesh with said first gear (14), and said system includes a fuel pump (21) for delivering fuel to said engine (10), said fuel pump (21) having a camshaft (19), said second shaft (19) being said camshaft (19), and said first and second gears (14,13) having a gear ratio such that said first shaft (16) is rotated through a full revolution for each two full revolutions of said crank shaft (11).

18. A system according to claim 17, including first and second circular members (12,52) each rotatable about the respective centers thereof, wherein there are a plurality of said first sensible members (47) located on said first circular member (12) spaced equiangularly around said first circular member (12) and wherein there are a plurality of said second sensible members (53) located on said second circular member (52) spaced equiangularly around said second circular member (52).

19. A system according to claim 18 including:
speed-indicating means (71) for generating a speed-indicating signal inversely proportional to said first count of said counting means (78).

20. A system according to claim 18 wherein the number of said first and second sensible members (47,53) is such that N number of each of said first and second signals (49,55) are generated by said first and second signal generator means (48,54) during one full revolution of said engine-driven crank shaft (11), N being an integer, wherein said counting means (78) has the further function of obtaining N/M number of successive first and second counts during said one full revolution of said crank shaft (11), M being an integer, wherein said angle-indicating means (79-83) has the further function of generating N/M number of successive angle-indicating signals during said one full revolution of said crank shaft (11), and further including:
angle-averaging means (84,85) for generating an average-angle signal equal to the sum of NP/M number of successive of said angle-indicating signals divided by the number NP/M, wherein P is an integer representing a predetermined number of successive full revolutions of said crank-shaft (11).

21. A system according to claim 20 wherein said counting means (78) has the further function of obtaining said first count by obtaining (69a) a third count of the number of clock pulses occurring in the time interval (T₃) between two successive time intervals (T₂) wherein said second count is obtained and by adding (69b) said third count to one of said second counts.

22. In a system according to claim 20 wherein said counting means (78) includes first and second pulse counters (69,77), a first gate (66) connected between said clock means (65) and said first pulse counter (69), and a second gate (67) connected between said clock means (65) and said second pulse counter (77), said first gate (66) being successively closed and opened by successive signals (49) from one (48) of said first and second signal generating means (48,54), said second gate (67) being closed by a signal (55) from the other (54) of said first and second signal generating means (48,54) and opened by a signal (49) from said one (48) of said first and second signal generating means (48,54).

23. In a system according to claim 20 wherein said counting means (78) includes first and second pulse counters (69a,77), a first gate (66) connected between said clock means (65) and said first pulse counter (69a), and a second gate (67) connected between said clock means (65) and said second pulse counter (77), said first gate (69a) being closed by a signal (49) from one (48) of said first and second signal generating means (48,54) and opened by a signal (55) from the other (54) of said first and second signal generating means (48,54), said second gate (77) being closed by a signal (55) from said other (54) of said first and second signal generating means (48,54) and opened by a signal (49) from said one (48) of said first and second signal generating means (48,54).

24. A system according to claim 20 and further including:
  speed-indicating means (71) for generating N/M number of successive speed-indicating signals during said one full revolution of said crank-shaft (11), each speed-indicating signal being inversely proportional to said first count of said counting means (78); and
  speed-averaging means (72,73) for generating an average-speed signal equal to the sum of NP/M number of successive of said speed-indicating signals divided by the number NP/M.

25. In a system according to claim 24 where said counting means (78) includes first and second pulse counters (69,77), a first gate (66) connected between said clock means (65) and said first pulse counter (69), and a second gate (67) connected between said clock means (65) and said second pulse counter (77), said first gate (66) being successively closed and opened by successive signals (49) from one (48) of said first and second signal generating means (48,54) said second gate (67) being closed by a signal (55) from the other (54) of said first and second signal generating means (48,54) and opened by a signal (49) from said one (48) of said first and second signal generating means (48,54).

26. In a system according to claim 24 wherein said counting means (78) includes first and second pulse counters (69a,77) a first gate (66) connected between said clock means (65) and said first pulse counter (69a), and a second gate (67) connected between said clock means (65) and said second pulse counter (77), said first gate (69a) being closed by a signal (49) from one (48) of said first and second signal generating means (48,54) and opened by a signal (55) from the other (54) of said first and second signal generating means (48,54), said second gate (77) being closed by a signal (55) from said other (54) of said first and second signal generating means (48,54) and opened by a signal (49) from said one (48) of said first and second signal generating means (48,54).

27. In a system according to claim 20 wherein $$TIM = (T_2/T_1)K_T,$$

in which
  TIM = said angle-indicating signal,
  $T_1$ = said first count of said counting means,
  $T_2$ = said second count of said counting means,
  $K_T$ = a constant,
said angle-indicating means (79-83) having the further function of:
  (a) generating an initial reference angle-indicating signal TIM(o),
  (b) generating a subsequent angle-indicating signal TIM(t),
  (c) generating a corrected angle-indicating signal TIM(T), wherein $$TIM(T) = TIM(t) - TIM(o),$$

when TIM(t) ≥ TIM(o), and $$TIM(T) = TIM(t) + K_T - TIM(o),$$

when TIM(t) < TIM(o).

28. Speed indicating apparatus for an internal combustion engine (10) and a rotatable shaft (16) driven by said engine (10) at a speed of rotation proportional to the rotational speed of said engine (10), said apparatus comprising:
  clock means (65) for generating a series of fixed frequency clock pulses;
  a plurality of sensible members (47) equally spaced apart and rotatable through a circular path in response and relative to rotation of the engine;
  a sensor (50) located adjacent a predetermined point in said circular path and adapted for delivering a signal (49) each successive time said engine (10) has rotated through 360/N degrees, N being in integer;
  counting means (78) for obtaining a count of the number of clock pulses occurring during a time interval ($T_1$) beginning and ending with successive signals (49) delivered by said sensor (50), said counting means (78) having the function of obtaining a new such count each successive time that said engine (10) has rotated through 360 N/M degrees, M being an integer;
  speed-indicating means (71) for generating a speed-indicating signal inversely proportional to each count of said counting means (78) each time that said engine (10) has rotated through 360 N/M degrees; and,
  averaging means (72,73) for generating an average-speed signal, each time said engine (10) has rotated through 360 N/M degrees, said average speed signal being equal to the sum of NP/M successive speed-indicating signals divided by NP/M, wherein P is an integer.

29. Speed indicating apparatus as set forth in claim 28, wherein M=2 and P=2.

30. Speed indicating apparatus as set forth in claim 28, wherein M=1 and P=2.

31. Speed indicating apparatus as set forth in claim 28 and further including a second rotation responsive means (51) for generating a signal (55) each successive time that said engine (10) has rotated through 360/N degrees, and wherein said counting means (78) has the further function of obtaining the count of the number of clock pulses occurring during a time interval ($T_1$) beginning and ending with successive pulses of said first mentioned rotation responsive means (46) by separately counting the number of clock pulses occurring in the time interval ($T_3$) beginning with a signal (49) from said first mentioned rotation responsive means (46) and ending with the next occurring signal (55) from said second rotation responsive means (51) and counting the number of clock pulses occurring in the time interval ($T_2$) beginning with the last mentioned signal (55) from said second rotation responsive means (51) ending with the next occurring signal (49) of said first mentioned rotation responsive means (46).

* * * * *